(12) United States Patent
Battles et al.

(10) Patent No.: US 7,027,094 B2
(45) Date of Patent: Apr. 11, 2006

(54) MODELESS DIGITAL STILL CAMERA USING TOUCH-SENSITIVE SHUTTER BUTTON

(75) Inventors: Amy E Battles, Windsor, CO (US); Kenneth Jay Hall, Windsor, CO (US); David J Staudacher, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 09/885,064

(22) Filed: Jun. 21, 2001

(65) Prior Publication Data

US 2002/0196357 A1    Dec. 26, 2002

(51) Int. Cl.
*H04N 5/222* (2006.01)
*H04N 5/225* (2006.01)
*G03B 15/06* (2006.01)

(52) U.S. Cl. ............ 348/333.01; 396/374; 348/373

(58) Field of Classification Search ........... 348/333.01, 348/333.02, 333.05, 333.08, 333.09, 333.13, 348/341, 372; 396/374
See application file for complete search history.

(56) References Cited

U.S. PATENT DOCUMENTS

| | | | | |
|---|---|---|---|---|
| 4,837,628 A | | 6/1989 | Sasaki | 358/209 |
| 4,885,643 A | | 12/1989 | Ichimura et al. | 358/335 |
| 5,497,193 A | | 3/1996 | Mitsuhashi et al. | 348/231 |
| 5,699,115 A | * | 12/1997 | Hiraki et al. | 348/333.13 |
| 5,845,161 A | * | 12/1998 | Schrock et al. | 396/313 |
| 5,867,742 A | | 2/1999 | Salvas et al. | 396/263 |
| 5,923,908 A | * | 7/1999 | Schrock et al. | 396/263 |
| 6,091,450 A | * | 7/2000 | Hirasawa | 348/333.01 |
| 6,122,003 A | * | 9/2000 | Anderson | 348/207.99 |
| 6,137,534 A | | 10/2000 | Anderson | 348/222 |
| 6,184,930 B1 | | 2/2001 | Mitsuhashi et al. | 348/333.01 |
| 6,535,694 B1 | * | 3/2003 | Engle et al. | 396/263 |
| 6,597,400 B1 | * | 7/2003 | Nishimura | 348/333.02 |
| 6,734,910 B1 | * | 5/2004 | Yumoto et al. | 348/333.05 |
| 6,822,683 B1 | * | 11/2004 | Torikai | 348/333.13 |
| 6,919,927 B1 | * | 7/2005 | Hyodo | 348/333.02 |
| 2002/0054233 A1 | * | 5/2002 | Juen | 348/333.01 |
| 2004/0183934 A1 | * | 9/2004 | Tatamiya | 348/333.02 |
| 2005/0184972 A1 | * | 8/2005 | Tashiro et al. | 348/173 |

FOREIGN PATENT DOCUMENTS

| | | | | |
|---|---|---|---|---|
| JP | 54033030 A | * | 3/1979 | |
| JP | 10313422 A | * | 11/1998 | |
| JP | 1125488 A | * | 9/1999 | |
| JP | 2000138854 A | * | 5/2000 | |
| JP | 2000165705 A | * | 6/2000 | |
| JP | 2003046856 A | * | 2/2003 | |

\* cited by examiner

*Primary Examiner*—Ngoc-Yen Vu
*Assistant Examiner*—John M. Villecco

(57) ABSTRACT

A modeless electronic imaging apparatus, such as a digital still camera, uses a touch-sensitive shutter button to automatically display "live" images from an image sensor whenever a user touches the shutter button. When the user is not touching the shutter button, the apparatus displays stored image data of the last stored image, or may display menu data according to actuation of system navigation buttons. The apparatus does not require the switching of modes between image capture mode and stored image display mode, but is always capable of image capture as well as stored image display.

14 Claims, 3 Drawing Sheets

the opportunity to capture a fleeting image. Similarly, the user viewing the temporary display of a captured image is frustrated when the

MODELESS DIGITAL STILL CAMERA USING TOUCH-SENSITIVE SHUTTER BUTTON

FIELD OF THE INVENTION

The present invention relates generally to digital still cameras, and more particularly to a modeless digital still camera that does not require any mode switching between image capture and image playback functions.

BACKGROUND OF THE INVENTION

Instead of exposing photosensitive film that must be developed in a photographic laboratory, electronic or digital cameras use an electronic image sensor array, such as a CCD (Charge-Coupled Device) array, to capture an image focused on the array by a lens assembly by generating electronic image data from the image sensor array and storing the image data in an electronic storage medium. Consequently, it is possible for the operator to view a captured image immediately after the image data is created.

As a result of this capability, most digital cameras on the market include a color LCD (liquid crystal display) device, usually integrated into the back of the camera body. In addition to viewing stored images, the LCD is used to "frame" images for capture, similar to the viewfinder in a conventional photographic film camera. In fact, while most present day digital cameras include a conventional viewfinder, many if not most digital camera operators use the camera's LCD to compose images for capture. To view such images, the digital camera converts the image focused on the camera's image sensor device into electrical image data signals that are sent directly to the LCD. Such image data signals are sent to the LCD continuously and in rapid succession, such that the displayed image on the LCD appears as a live video image. Such a display is typically known as a "live view" to denote that the image being displayed corresponds to the instantaneous images being received by the lens assembly. The user may capture a "live view" image by actuating the shutter button, which causes the image sensor device to generate electronic image data that is then stored in the camera's storage medium.

Typically, the image captured and stored is temporarily displayed on the LCD for a few moments immediately after capture, subsequent to which the display returns to "live view" to enable the user to compose another picture. If the user wishes to review or study the image just captured, or show the captured image to others, it is necessary with prior art digital cameras to switch the camera from a "record" or image capture mode to a "playback" or stored picture display mode. This is usually accomplished either by rotating a function dial on the camera body from a "record" position to a "playback" position, or by moving a function switch between analogous positions.

Thus, a user taking a series of pictures who desires to review image capture results is required to switch the mode of the digital camera between "record" and "playback" each time that an image is captured and stored. This is a significant shortcoming in the art. This further presents a source of confusion and frustration to the user in a number of circumstances. The user who forgets to switch the camera back to record mode after having viewed a stored image will be unable to capture a desired image by pressing the shutter button, thereby possibly completely losing the opportunity to capture a fleeting image. Similarly, the user viewing the temporary display of a captured image is frustrated when the LCD reverts to live view, should the user wish to continue viewing the last captured image. Further, because conventional photographic film cameras do not have the capability of viewing photos, such cameras are always in a "capture" mode and camera users are conditioned to expect the same behavior from digital cameras. Because of this the different switchable modes of a digital camera may confuse many users.

Prior art attempts to solve such problems are known. U.S. Pat. No. 6,137,534 discloses the provision of an automatic "instant review" mode whereby a last captured image in an image capture device is displayed in a "screennail" format immediately after capture, while image processing is still being carried out, However, it is necessary for the user to consciously switch to this mode, and the user still must switch back to a "live mode" in order to continue taking pictures. U.S. Pat. No. 6,184,930 discloses a two-level push button switch for carrying out a first switching operation to capture and store a displayed image in memory, and a second switching operation for displaying the last stored image data. However, the image capture device still must be switched between image capture mode and playback mode to view other stored images, and the user is required to properly actuate the different levels of the push button in order to view a last captured image.

There thus exists a need in the art for further improvements to digital cameras to eliminate the shortcomings mentioned.

SUMMARY OF THE INVENTION

The present invention eliminates the shortcomings in the prior art and provides a significant advance in the art, by providing a digital camera that does not require any switching between different modes, such as between a record or capture mode and a playback or stored image viewing mode. According to the invention, the digital camera can always be a playback state and a user is able to obtain a live view and capture an image simply by pressing the shutter button at any time. After the image has been captured, it is displayed automatically and indefinitely on the display device of the camera. The user may continue to view the last captured image, or may scroll through other stored images for display.

Specifically, according to one preferred embodiment, the present invention provides an electronic imaging apparatus including an image sensor device responsive to light focused on said image sensor device from an object to be imaged, for converting focused light into image data; a storage medium for storing selected image data from the image sensor device and data related to stored images; a display for displaying images and related data from the storage medium and images from the image sensor device; a touch-sensitive shutter button producing a touch signal in response to the touching of a user's finger on the button, and producing an actuation signal upon actuation of the button by a user; and a processor responsive to the touch signal to cause the display to display an image from the image sensor device, responsive to the actuation signal to cause image data from the image sensor device to be stored in the storage medium, and responsive to the absence of the touch signal to cause the display to display an image and/or related data from the storage medium.

According to another aspect, the invention provides a method of operating an electronic imaging apparatus having a display capable of being selectively deactivated, comprising the steps of providing a touch-sensitive shutter button responsive to contact of a user's finger thereon for producing a touch signal; displaying on the display an instantaneous image from an image sensor in response to the touch signal; and displaying data from a storage medium of the apparatus in the absence of the touch signal when the display is activated.

DETAILED DESCRIPTION OF THE PREFERRED EMBODIMENTS

Figure 1:
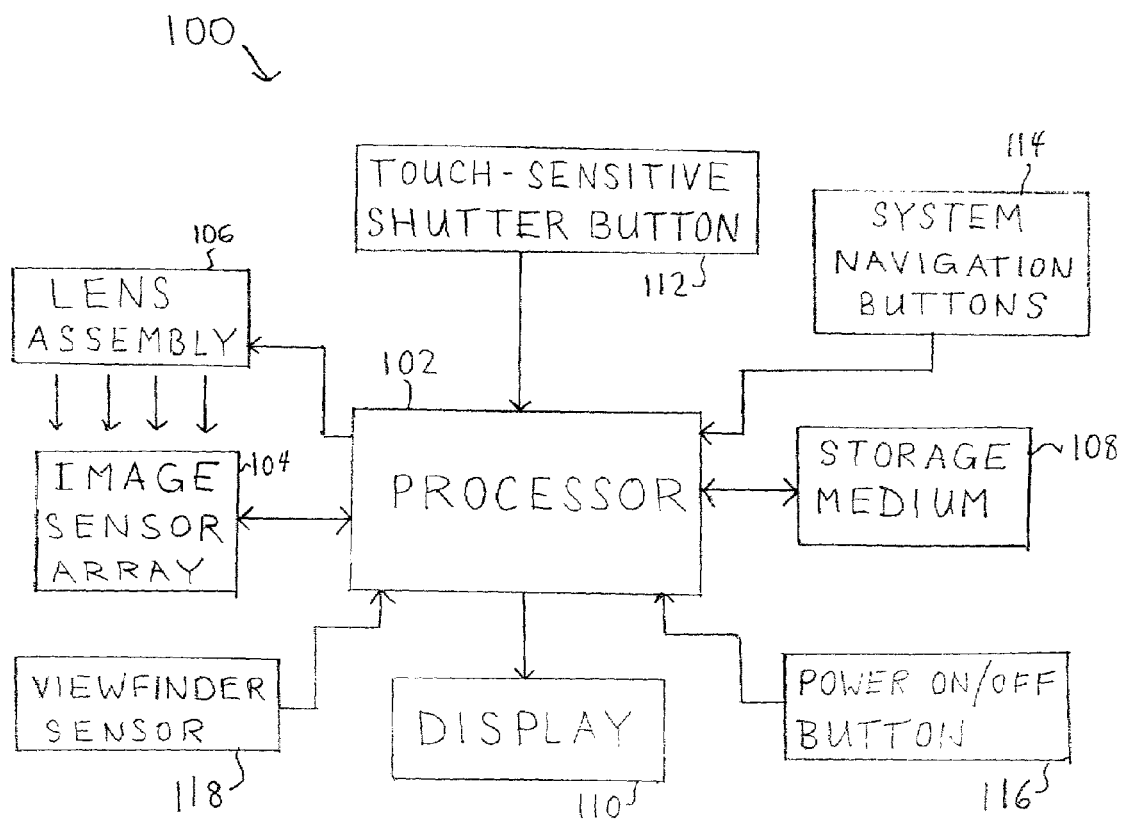
FIG. 1 is a block diagram of a modeless digital still camera according to a preferred embodiment of the invention.

FIG. 1 is a block diagram of the components of a modeless digital camera 100 according to one preferred embodiment of the invention. The camera 100 includes a processor 102, such as a microprocessor, CPU or similar device capable of executing mathematical or logic operations on data in response to program instructions. The camera further includes an image sensor array 104, such as a CCD (charge-coupled device) array or equivalent image sensing device; a lens assembly 106 for focusing light reflected from a scene or object of interest onto the image plane of the image sensor array 104; a display 110 such as an LCD or similar type display; a storage medium 108 such as flash memory, RAM, a memory stick, or similar solid state memory for storing image data from the image sensor device, as well as secondary data relating to stored images.

The camera 100 further includes one or more system navigation buttons 114, such as arrow buttons, scrolling buttons, select buttons, etc. for selecting and using the various functional capabilities of the camera, and a power on/off button 116. The camera 100 according to the invention further includes a touch-sensitive shutter button 112, and optionally includes a viewfinder sensor 118.

According to the invention, the digital camera 100 does not require switching between modes of operation, but is always capable of capturing an image and is always capable of displaying stored images. According to the invention, the touch-sensitive shutter button 112 is sensitive to the touch (as opposed to the actuation by pressing) of a user's finger such that the button sends a touch signal to the processor when a user touches her finger to the shutter button. When the processor receives this signal, it causes the display 110 to display a live view of the scene being projected through the lens assembly 106 onto the image sensor array 104. The user observes the live view to compose a picture for capture, while touching the shutter button 112. When the user desires to capture an image, the user presses the shutter button 112 as in the prior art to cause image data from the image sensor array to be processed by the processor and stored in the storage medium 108.

In the absence of the touch signal, the processor causes the display device 110 to display the last stored image. The processor is responsive to the actuation of the navigational buttons 114 to enable the user to scroll through stored images in the storage medium 108 for display on the display device 110, and also to enable the user to edit, modify or otherwise manipulate stored images as desired.

Figure 2:
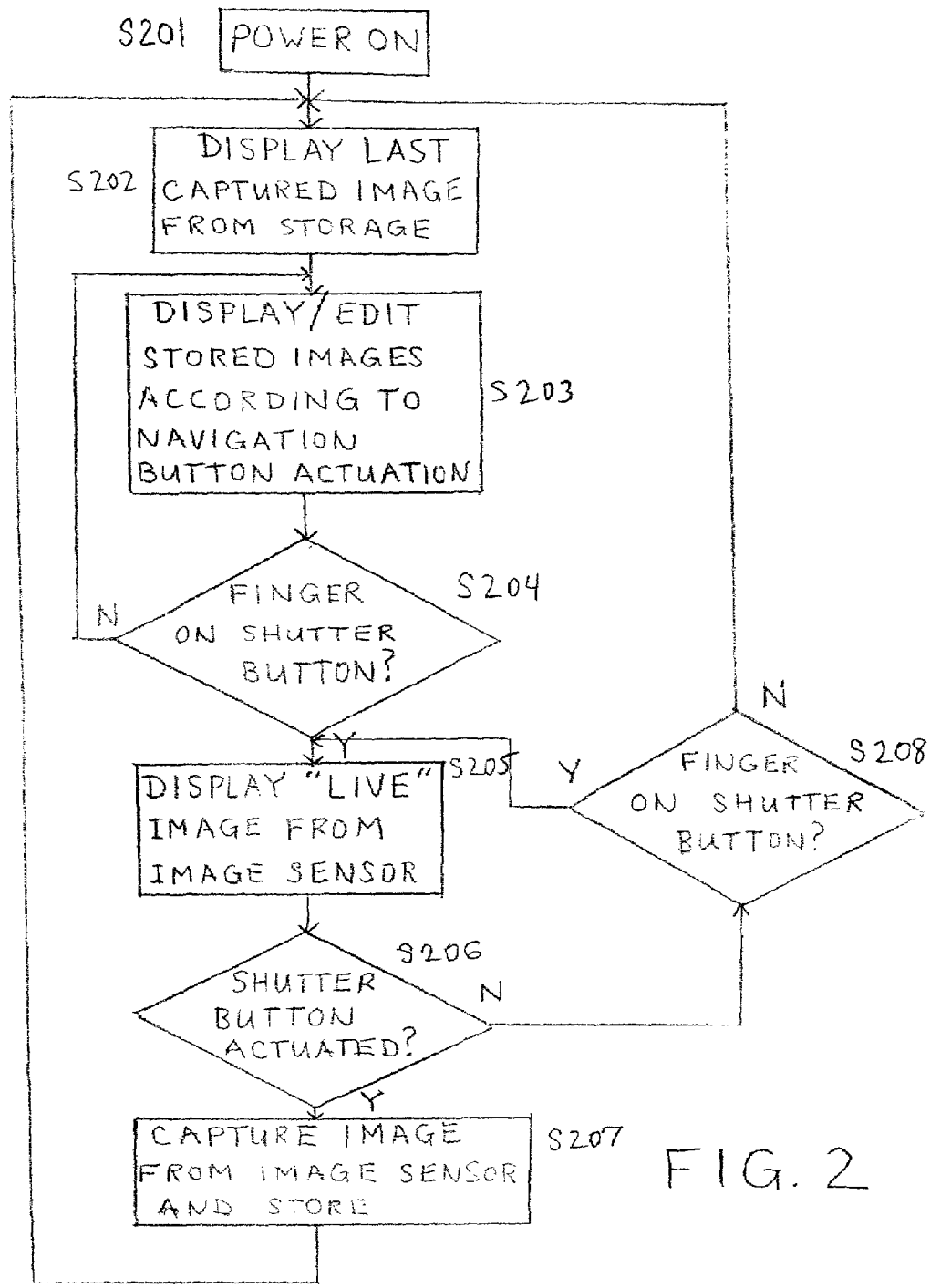
FIG. 2 is a flow diagram of one method of operation of a digital still camera according to the invention.

FIG. 2 illustrates one example of the operation of the digital camera according to the present invention. At step S201 the user turns on the power to the camera by pressing the power on/off button 116. At step S202, upon power up the camera displays the last captured image as stored in the storage medium. At S203 the processor is responsive to actuation of various system navigation buttons to scroll, display or edit stored images, or display various menus as desired by the user. If the navigation buttons are not actuated, the processor at step S204 detects whether a user's finger is touching the shutter button, by determining whether a touch signal is being received from the touch-sensitive shutter button 112. If not, the processor remains ready to respond to user actuation of the system navigation buttons.

If the processor detects the presence of the user's finger on the shutter button at S204, the processor at S205 causes a "live view" of the image being focused onto the image sensor array 104 to be displayed on the display device 110. The processor at S206 then detects whether the user has actuated the shutter button by pressing it down. If not, at S208 the processor detects whether the user is still touching the shutter button. If so, the processor continues to detect whether the shutter button has been actuated by the user. If at S208 it is determined that the user is no longer touching the shutter button, the processor again causes the display to return to the last captured image at S202, and the processor continues to be responsive to the navigation buttons and to the touching of the shutter button.

When the processor detects at S206 that the user has actuated the shutter button, at S207 the processor causes the image data being produced by the image sensor array to be processed and stored in the storage medium 108. The processor then causes the image data just stored to be sent to the display 110 for display of the image represented by the data, at S202.

In this way, it will be appreciated that the modeless digital camera according to the invention always can be ready to capture and store an image, and at the same time always be essentially in a "playback" state whereby the user is able to view immediately and indefinitely all captured images.

Figure 3:
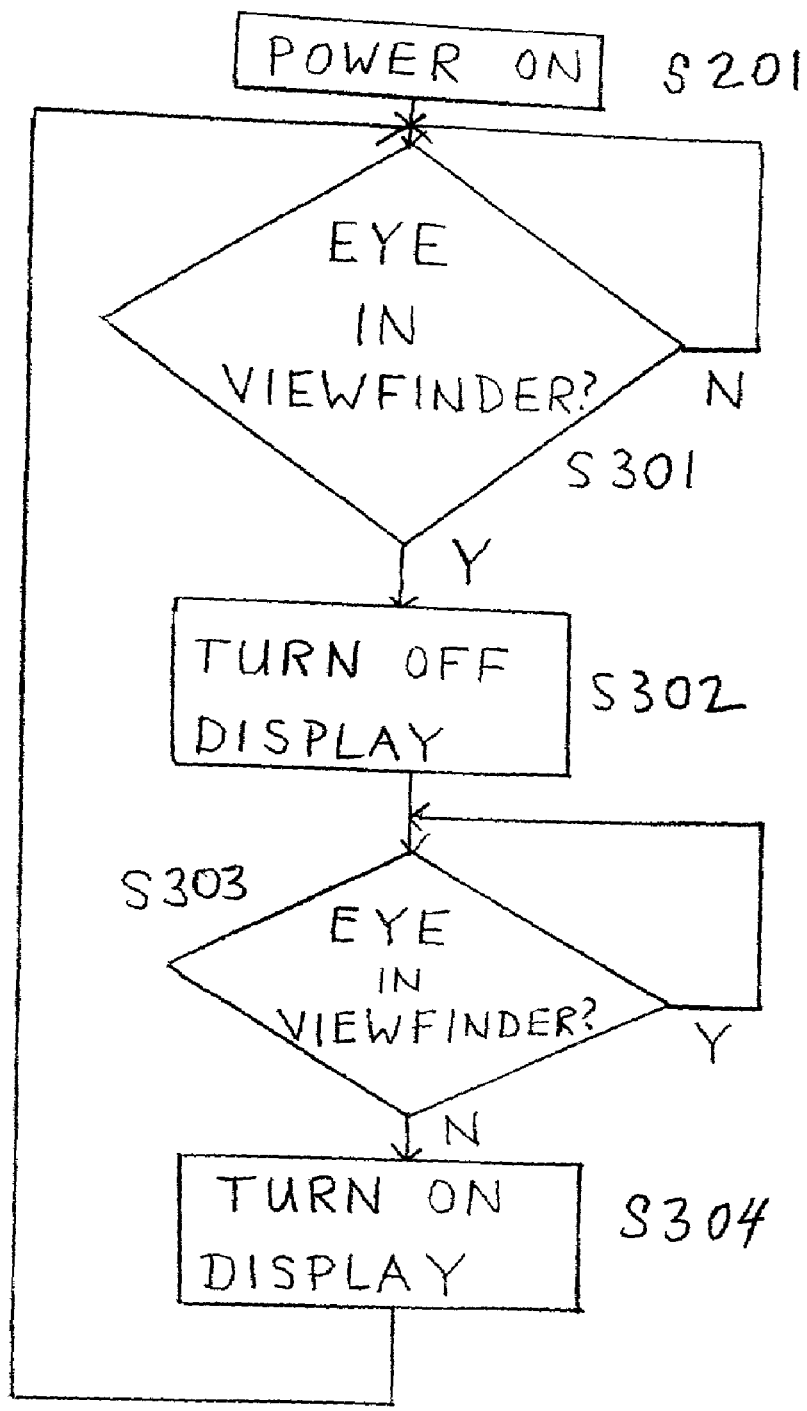
FIG. 3 is a flow diagram of a method of operation of a digital still camera according to an alternate embodiment of the invention including a viewfinder sensor.

According to the invention, the display optionally may be turned off using a navigation button to conserve battery power. In this regard, many digital cameras provide a conventional optical viewfinder for framing images in addition to an LCD, since continuous use of the LCD consumes a large amount of battery power. According to an alternate embodiment of the invention, a viewfinder sensor 118 is provided to detect the presence of a user's eye in the viewfinder. As shown in FIG. 3, after power up (S201) the processor detects whether a viewfinder sensor signal is received (S301) indicating that the user has placed her eye adjacent to the viewfinder on the camera. If so, the processor at S302 turns off power to the display 110 to conserve battery power. The processor continues to monitor the presence of the user's eye in the viewfinder at S303. When the user removes her eye from the viewfinder, at S304 the processor again turns on the display, and subsequently continues to monitor for receipt of the viewfinder sensor signal at S301.

Additionally, the display optionally may be turned off or deactivated to conserve battery power upon the expiration of a timeout period, such as a timeout period during which there has been no user activity.

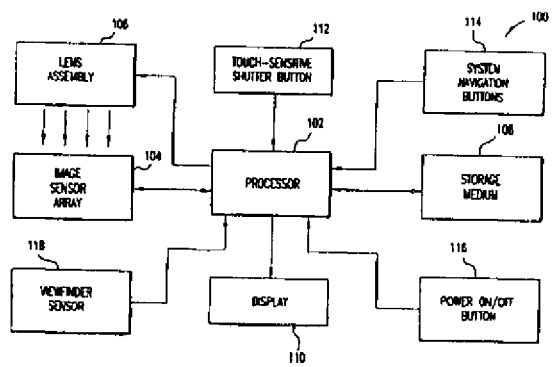

What is claimed is:

1. An electronic imaging apparatus comprising:
   an image sensor device responsive to light focused on said image sensor device from an object to be imaged, for converting said focused light into image data;
   a storage medium for storing selected image data from said image sensor device and data related to stored images;
   a display for displaying images and related data from said storage medium and images from said image sensor device;
   a touch-sensitive shutter button producing a touch signal in response to the touching of a user's finger on said button, and producing an actuation signal upon actuation of said button by a user; and
   a processor responsive to said touch signal to cause said display to display an image from said image sensor device, responsive to said actuation signal to cause image data from said image sensor device to be stored in said storage medium, and responsive to the absence of said touch signal to cause said display to display an image and/or related data from said storage medium.

2. An electronic imaging apparatus as set forth in claim 1, wherein said data related to stored images comprises menu data.

3. An electronic imaging apparatus as set forth in claim 2, further including at least one navigation button for selecting an item listed in said menu data.

4. An electronic imaging apparatus as set forth in claim 1, wherein said display is an LCD.

5. An electronic imaging apparatus as set forth in claim 1, wherein said image sensor device is a CCD array.

6. An electronic imaging apparatus as set forth in claim 1, further comprising an optical viewfinder for framing images to be captured, and a viewfinder sensor for determining the presence of a user's eye is adjacent to the viewfinder and producing a viewfinder sensor signal in response to said determination;
   wherein said processor is responsive to said viewfinder sensor signal to turn off power to said display.

7. In an electronic imaging apparatus having a display, an image sensor for producing image data in response to an optical image focused on said image sensor, and a storage medium for storing image data, the improvement comprising:
   a touch-sensitive shutter button, wherein merely touching the shutter button without pressing the shutter button down is sufficient to cause the shutter button to produce a signal that causes said display to receive image data from said image sensor and display images corresponding thereto.

8. The electronic imaging apparatus of claim 7, wherein pressing down the shutter button causes the shutter button to produce an actuation signal.

9. The electronic imaging apparatus of claim 8, wherein the actuation signal causes image data from said image sensor to be stored in said storage medium.

10. The electronic imaging apparatus of claim 7, wherein the absence of said signal causes said display to display an image and/or related data from said storage medium.

11. A method of operating an electronic imaging apparatus having a display capable of being selectively deactivated, comprising the steps of:
    providing a touch-sensitive shutter button, wherein merely touching the shutter button without pressing down the shutter button is sufficient to cause said display to display an instantaneous image from an image sensor; and
    displaying data from a storage medium of said apparatus in the absence of said touch signal when said display is activated.

12. A method of operating an electronic imaging apparatus as set forth in claim 11, further comprising the step of providing a viewfinder sensor for detecting the presence of a user's eye adjacent to a viewfinder of said apparatus and producing a viewfinder sensor signal in response thereto; and
    deactivating said display in response to said viewfinder sensor signal.

13. A method of operating an electronic imaging apparatus as set forth in claim 11, wherein said data from said storage medium includes stored image data and menu data.

14. A method of operating an electronic imaging apparatus as set forth in claim 11, further comprising the step of causing image data from said image sensor to be stored in said storage medium upon actuation of said touch-sensitive shutter button by pressing said shutter button.

* * * * *

UNITED STATES PATENT AND TRADEMARK OFFICE
CERTIFICATE OF CORRECTION

PATENT NO. : 7,027,094 B2  Page 1 of 5
APPLICATION NO. : 09/885064
DATED : April 11, 2006
INVENTOR(S) : Amy E Battles et al.

It is certified that error appears in the above-identified patent and that said Letters Patent is hereby corrected as shown below:

The title page showing the illustrative figure should be deleted to be replaced with the attached title page.

In the drawings:

On sheet 1 of 3, delete " 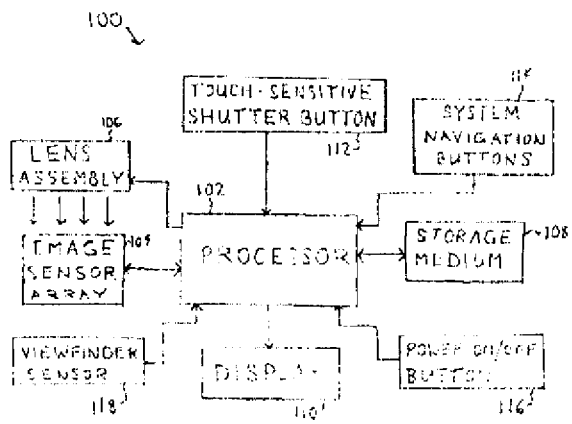 " and

Signed and Sealed this

Seventh Day of September, 2010

David J. Kappos
*Director of the United States Patent and Trademark Office* insert -- 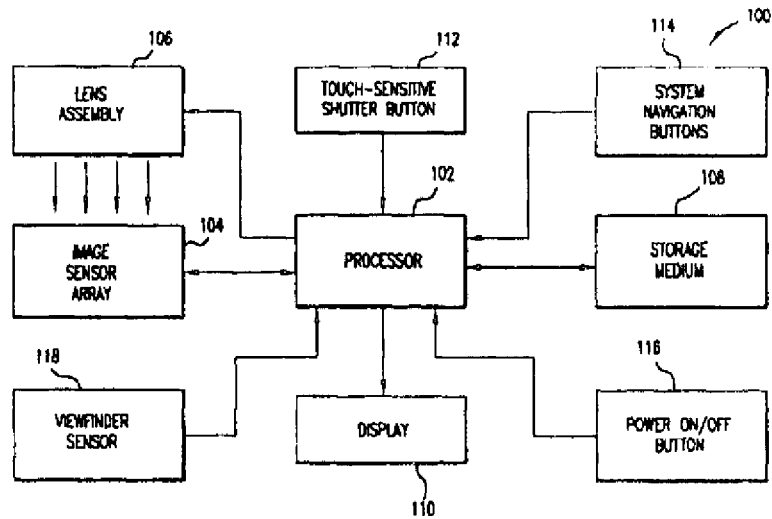 --, therefor.
FIG.1
On sheet 2 of 3, delete " 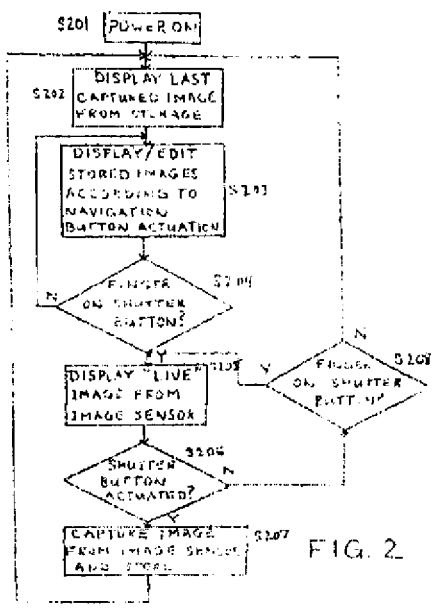 " and

CERTIFICATE OF CORRECTION (continued)
U.S. Pat. No. 7,027,094 B2 insert -- 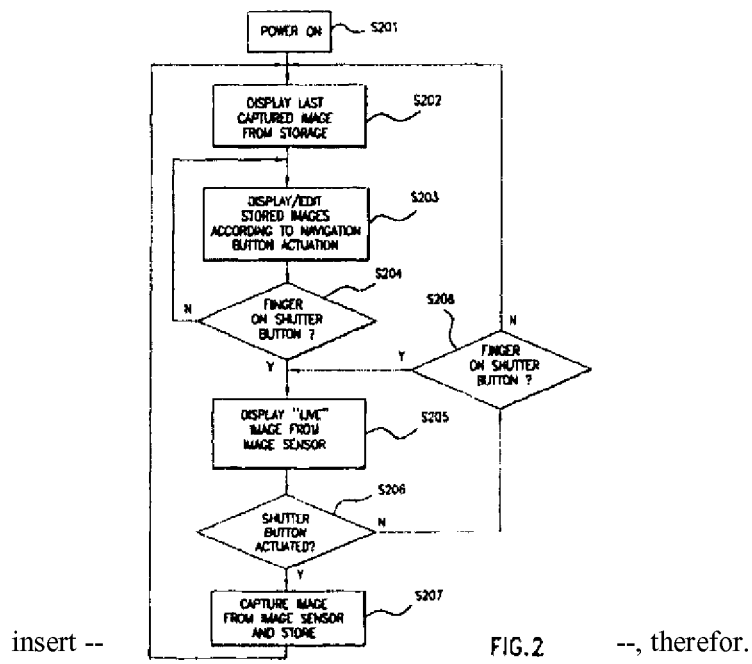 --, therefor.

On sheet 3 of 3, delete " 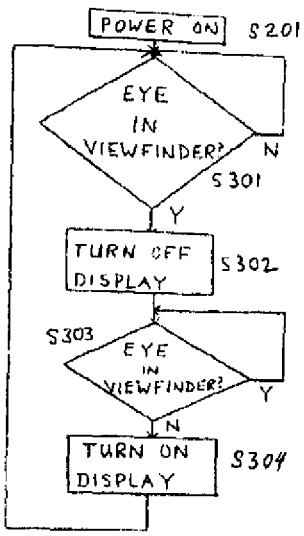 " and

CERTIFICATE OF CORRECTION (continued)
U.S. Pat. No. 7,027,094 B2

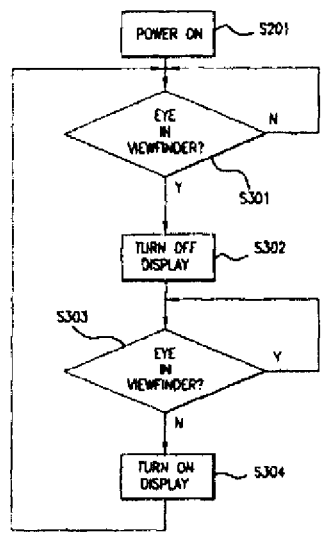

insert --     FIG.3     --, therefor.

United States Patent
Battles et al.

(10) Patent No.: US 7,027,094 B2
(45) Date of Patent: Apr. 11, 2006

(54) MODELESS DIGITAL STILL CAMERA USING TOUCH-SENSITIVE SHUTTER BUTTON

(75) Inventors: Amy E Battles, Windsor, CO (US); Kenneth Jay Hall, Windsor, CO (US); David J Staudacher, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 09/885,064

(22) Filed: Jun. 21, 2001

(65) Prior Publication Data

US 2002/0196357 A1 Dec. 26, 2002

(51) Int. Cl.
*H04N 5/222* (2006.01)
*H04N 5/225* (2006.01)
*G03B 15/06* (2006.01)

(52) U.S. Cl. .............. 348/333.01; 396/374; 348/373
(58) Field of Classification Search ......... 348/333.01, 348/333.02, 333.05, 333.08, 333.09, 333.13, 348/341, 372; 396/374
See application file for complete search history.

(56) References Cited

U.S. PATENT DOCUMENTS

| | | | |
|---|---|---|---|
| 4,837,628 A | 6/1989 | Sasaki | 358/209 |
| 4,885,643 A | 12/1989 | Ichimura et al. | 358/335 |
| 5,497,193 A | 3/1996 | Mitsuhashi et al. | 348/231 |
| 5,699,115 A * | 12/1997 | Hiraki et al. | 348/333.13 |
| 5,845,161 A * | 12/1998 | Schrock et al. | 396/313 |
| 5,867,742 A | 2/1999 | Salvas et al. | 396/263 |
| 5,923,908 A * | 7/1999 | Schrock et al. | 396/263 |
| 6,091,450 A * | 7/2000 | Hirasawa | 348/333.01 |
| 6,122,003 A * | 9/2000 | Anderson | 348/207.99 |
| 6,137,534 A | 10/2000 | Anderson | 348/222 |
| 6,184,930 B1 | 2/2001 | Mitsuhashi et al. | 348/333.01 |
| 6,535,694 B1 * | 3/2003 | Engle et al. | 396/263 |
| 6,597,400 B1 * | 7/2003 | Nishimura | 348/333.02 |
| 6,734,910 B1 * | 5/2004 | Yumoto et al. | 348/333.05 |
| 6,822,683 B1 * | 11/2004 | Torikai | 348/333.13 |
| 6,919,927 B1 * | 7/2005 | Hyodo | 348/333.02 |
| 2002/0054233 A1 * | 5/2002 | Juen | 348/333.01 |
| 2004/0183934 A1 * | 9/2004 | Tatumiya | 348/333.02 |
| 2005/0184972 A1 * | 8/2005 | Tashiro et al. | 348/173 |

FOREIGN PATENT DOCUMENTS

| | | | |
|---|---|---|---|
| JP | 54033030 A | * | 3/1979 |
| JP | 10313422 A | * | 11/1998 |
| JP | 1125488 A | * | 9/1999 |
| JP | 2000138854 A | * | 5/2000 |
| JP | 2000165705 A | * | 6/2000 |
| JP | 2003046856 A | * | 2/2003 |

\* cited by examiner

*Primary Examiner*—Ngoc-Yen Vu
*Assistant Examiner*—John M. Villecco

(57) ABSTRACT

A modeless electronic imaging apparatus, such as a digital still camera, uses a touch-sensitive shutter button to automatically display "live" images from an image sensor whenever a user touches the shutter button. When the user is not touching the shutter button, the apparatus displays stored image data of the last stored image, or may display menu data according to actuation of system navigation buttons. The apparatus does not require the switching of modes between image capture mode and stored image display mode, but is always capable of image capture as well as stored image display.

14 Claims, 3 Drawing Sheets